United States Patent
Ying et al.

(10) Patent No.: US 10,148,164 B2
(45) Date of Patent: Dec. 4, 2018

(54) TOPOLOGY OF COMPOSITE CASCADED HIGH-VOLTAGE AND LOW-VOLTAGE MODULES

(71) Applicant: Delta Electronics (Shanghai) Co., Ltd., Shanghai (CN)

(72) Inventors: Jianping Ying, Shanghai (CN); Zhiming Hu, Shanghai (CN); Wei Tian, Shanghai (CN); Wei Xu, Shanghai (CN); Jianfei Zheng, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/888,089

(22) Filed: Feb. 5, 2018

(65) Prior Publication Data

US 2018/0248468 A1 Aug. 30, 2018

(30) Foreign Application Priority Data

Feb. 27, 2017 (CN) .......................... 2017 1 0106946

(51) Int. Cl.
*H02M 7/155* (2006.01)
*H02M 1/088* (2006.01)
(Continued)

(52) U.S. Cl.
CPC ............. *H02M 1/088* (2013.01); *H02M 3/24* (2013.01); *H02M 7/483* (2013.01); *H02J 3/1828* (2013.01);
(Continued)

(58) Field of Classification Search
CPC ................................................... H02M 7/155
(Continued)

(56) References Cited

U.S. PATENT DOCUMENTS 7,705,705 B2 * 4/2010 Zeng ................... H01F 27/2804
336/212
8,686,746 B2 * 4/2014 Zhou .................. G01R 27/2605
324/605

(Continued)

FOREIGN PATENT DOCUMENTS

CN 102148579 A 8/2011
CN 102611345 A 7/2012
(Continued)

OTHER PUBLICATIONS

International Search Report of the parallel PCT application dated Mar. 6, 2018.
(Continued)

*Primary Examiner* — Adolf Berhane
*Assistant Examiner* — Nusrat Quddus
(74) *Attorney, Agent, or Firm* — CKC & Partners Co., Ltd.

(57) ABSTRACT

A topology of composite cascaded high-voltage and low-voltage modules is provided. It includes at least one high-voltage module, at least one low-voltage module, at least one local control circuit and at least one DC-to-DC module. At least one high-voltage module is connected with at least one low-voltage module in cascade manner. At least one local control circuit outputs at least one signal to at least one high-voltage driving circuit and at least one low-voltage driving circuit. An input of at least one DC-to-DC module is connected with two ends of a low-voltage bus capacitor, for receiving a low-voltage DC bus voltage and converting the low-voltage DC bus voltage into a DC output voltage, so as to provide one or more of at least one high-voltage driving circuit, at least one low-voltage driving circuit and at least one local control circuit with a power supply.

10 Claims, 7 Drawing Sheets

(51) Int. Cl.
 H02M 3/24 (2006.01)
 H02M 7/483 (2007.01)
 H02J 3/18 (2006.01)
 H02J 3/38 (2006.01)
 H02M 1/32 (2007.01)

(52) U.S. Cl.
 CPC ............... *H02J 3/386* (2013.01); *H02M 1/32* (2013.01); *H02M 2007/4835* (2013.01)

(58) Field of Classification Search
 USPC ............................. 363/15, 17, 19, 123–127
 See application file for complete search history.

(56) References Cited

U.S. PATENT DOCUMENTS

2005/0237010 A1* 10/2005 Ying ................... H05B 41/245
 315/312
2009/0268496 A1* 10/2009 Tan .................... H02M 1/4216
 363/126

FOREIGN PATENT DOCUMENTS

| | | |
|---|---|---|
| CN | 202616988 U | 12/2012 |
| CN | 103280952 A | 9/2013 |
| CN | 103546024 A | 1/2014 |
| CN | 203522498 U | 4/2014 |
| CN | 204967648 U | 1/2016 |
| CN | 105356770 A | 2/2016 |
| CN | 105391313 A | 3/2016 |
| CN | 105453405 A | 3/2016 |
| CN | 206332626 U | 7/2017 |
| EP | 2595302 A1 | 5/2013 |
| TW | 265484 | 12/1995 |
| TW | 201218604 A | 5/2012 |
| TW | 201306470 A | 2/2013 |
| TW | 201528666 A | 7/2015 |
| TW | 201633691 A | 9/2016 |
| WO | 2012028640 A2 | 3/2012 |

OTHER PUBLICATIONS

International Search Report of the parallel PCT application dated Mar. 15, 2018.
International Search Report of the parallel PCT application dated Mar. 16, 2018.
International Search Report of the parallel PCT application dated Mar. 21, 2018.
Corresponding Taiwan office action dated Aug. 3, 2018.
Corresponding Taiwan office action dated Aug. 6, 2018.

* cited by examiner

TOPOLOGY OF COMPOSITE CASCADED HIGH-VOLTAGE AND LOW-VOLTAGE MODULES

CROSS-REFERENCE TO RELATED APPLICATIONS

This application claims priority to Chinese Patent Application No. 201710106946.X, filed on Feb. 27, 2017, which is hereby incorporated by reference in its entirety.

TECHNICAL FIELD

The present invention relates to the field of power electronics technology and, in particular, to a topology of composite cascaded high voltage module and low voltage modules.

BACKGROUND

Currently, converters, Static Var Generators (SVG), and wind power systems, etc. with a higher voltage level (such as 35 kV) usually adopt a topology of cascaded power conversion modules. For example, when a grid side of the topology is directly connected with a grid, and a load side of the topology is connected with a motor through an inverter, the topology is a converter; when the grid side of the topology is directly connected with the grid, and there is no load on the load side, the topology is an SVG; when the grid side of the topology is connected with a generator, and the load side of the topology is connected with the grid through a module, the topology is a wind power system; and when the grid side of the topology is connected with the generator, and there is no load on the load side of the topology, the topology is the SVG. A controller of each power conversion module needs a power supply, so how to get the power supply is very important. The present disclosure is to solve a problem with respect to taking power.

SUMMARY

Embodiments of the present disclosure provide a topology of composite cascaded high-voltage and low-voltage modules, so as to solve the problem with respect to taking power. When cascaded low-voltage modules are adopted, there are numerous control signals, a large number of low-voltage modules, higher cost and lower power density. When cascaded high-voltage modules are adopted, there are difficulties in withstand voltage between a primary side and a secondary side of a transformer in a DC-to-DC module, the withstand voltage is required to reach higher than 6 kV.

In a first aspect, an embodiment of the present disclosure provides a topology of composite cascade high-voltage and low-voltage modules, including:

at least one high-voltage module, including a high-voltage bus capacitor;

at least one low-voltage module, including a low-voltage bus capacitor; where the at least one low-voltage module is connected with the at least one high-voltage module in a cascade manner, and a low-voltage DC bus voltage of the low-voltage bus capacitor is lower than a high-voltage DC bus voltage of the high-voltage bus capacitor;

at least one local control circuit, for outputting at least one control signal to at least one high-voltage driving circuit and at least one low-voltage driving circuit;

the at least one high-voltage driving circuit, electrically connected with a corresponding power semiconductor switch group of the at least one high-voltage module, for generating a high-voltage drive signal according to the at least one control signal to drive ON or OFF of the power semiconductor switch group;

the at least one low-voltage driving circuit, electrically connected with a corresponding power semiconductor switch group of the at least one low-voltage module, for generating a low-voltage drive signal according to the at least one control signal to drive ON or OFF of the power semiconductor switch group; and at least one DC-to-DC module, where an input of the at least one DC-to-DC module is connected with two ends of the low-voltage bus capacitor, for receiving the low-voltage DC bus voltage, and converting the low-voltage DC bus voltage into a DC output voltage, so as to provide one or more of the at least one high-voltage driving circuit, the at least one low-voltage driving circuit and the at least one local control circuit with a power supply.

BRIEF DESCRIPTION OF THE DRAWINGS

In order to make a clearer description of technical solutions of embodiments in the present disclosure, drawings required in the embodiments will be briefed as follows. And apparently, the drawings in the following description illustrate some embodiments of the present disclosure, and for one with ordinary skill in the art, other drawings may also be obtained in accordance with the above drawings without delivering creative efforts.

DESCRIPTION OF EMBODIMENTS

In order to render a clearer description of the purpose, technical solutions and advantages of embodiments of the present disclosure, the technical solutions in the embodiments of the present disclosure will be described clearly and comprehensively as follows in conjunction with drawings accompanying the embodiments of the present disclosure. And apparently, the described embodiments are just part rather than all of the embodiments of the present disclosure. All the other embodiments acquired by one with ordinary skill in the art based on the embodiments of the present disclosure without delivering creative efforts shall fall into the protection scope claimed by the present disclosure.

Figure 1:
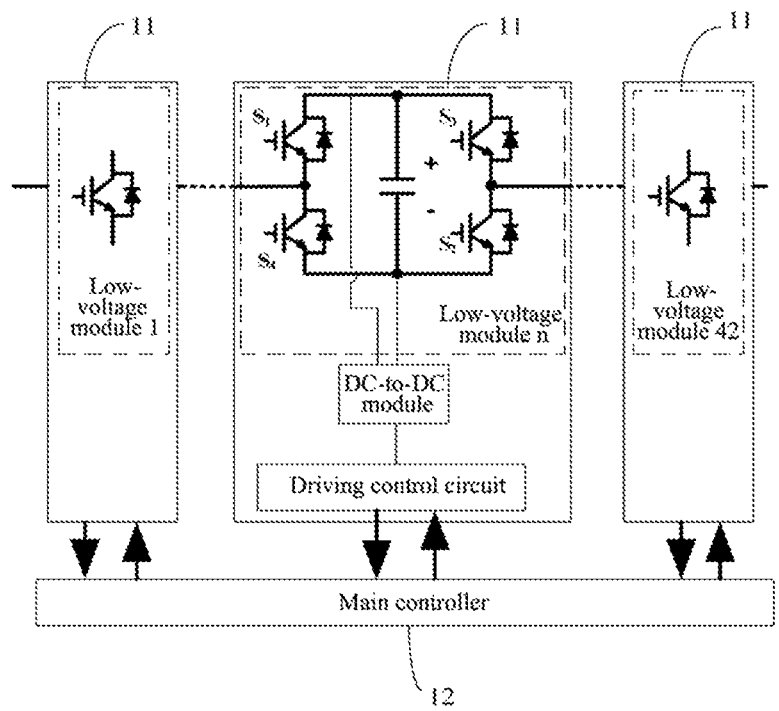
FIG. 1 is a topology structural diagram for cascaded low-voltage modules.

FIG. 1 is a topology structural diagram for cascaded low-voltage modules. As shown in FIG. 1, low-voltage modules 11 are cascaded. Taking an H bridge circuit as an example, each low-voltage module 11 includes: four power semiconductor switches S1, S2, S3 and S4. A DC bus voltage of the low-voltage module 11 is 1 kV. When the topology works in the SVG with a higher voltage level (such as 35 kV), each phase of the SVG needs about 42 low-voltage modules 11 cascaded, and three phases of the SVG need about 126 low-voltage modules 11 in total. The DC bus voltage and failure information of each of the low-voltage modules 11 are transmitted to a main controller 12 in real time and the main controller 12 also sends a control signal to each of the low-voltage modules 11, resulting in a large amount of communication. The topology of cascaded low-voltage modules may have the following problems: main controller 12 needs to output numerous control signals; a large number of low-voltage modules are used; the cost is higher; and the power density is lower.

Figure 2:
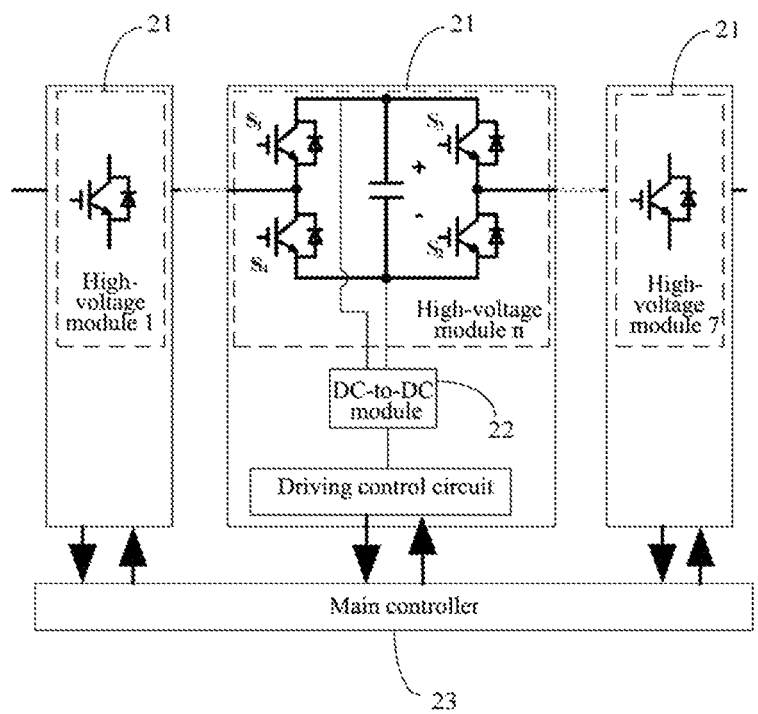
FIG. 2 is a topology structural diagram for cascaded high-voltage modules.

FIG. 2 is a topology structural diagram for cascade high-voltage modules. As shown in FIG. 2, high-voltage modules 21 are cascaded. And at a higher voltage level (for example, 35 kV), assuming that a DC bus voltage of the high-voltage module 21 is 6 kV, then each phase of the SVG only requires 7 high-voltage modules 21 cascaded, and three phases of the SVG requires 21 high-voltage modules in total, dramatically reducing both the communication amount and control signals, and requiring less high-voltage modules. A DC-to-DC (DC/DC) module 22 is connected to the high-voltage module 21 and takes power from the bus capacitor of the high-voltage module 21 to provide a main controller 23 with a power supply. Because the withstand voltage between a primary side and a secondary side of a transformer in the DC-to-DC module 22 is required to reach higher than 6 kV, the technology may be difficult to be realized.

Cascaded low-voltage modules exist following problems: numerous control signals, a large number of low-voltage modules, higher cost, and lower power density; and cascaded high-voltage modules converter exist following problem: the withstand voltage between a primary side and a secondary side of a transformer of the DC-to-DC module is required to reach above 6 kV, leading to difficulty in realizing the technology. In order to solve the foregoing problems, the present disclosure provide a topology of composite cascaded high-voltage and low-voltage modules.

The topology of composite cascaded high-voltage and low-voltage modules provided by the embodiments of the present disclosure is applicable to a frequency converter, an SVG, a wind power generation system, etc., with a relatively high voltage level (such as, but not limited to 35 kV). For example, when the grid side of the topology of composite cascaded high-voltage and low-voltage modules is directly connected with a grid, and the load side of the topology of composite cascaded high-voltage and low-voltage modules is connected with a motor through an inverter, then the topology of composite cascaded high-voltage and low-voltage modules is a frequency converter; when the grid side of the topology of composite cascaded high-voltage and low-voltage modules is directly connected with the grid, and there is no load, the topology of composite cascaded high-voltage and low-voltage modules is an SVG; when the grid side of the topology of composite cascaded high-voltage and low-voltage modules is a generator, the load side of the topology of composite cascaded high-voltage and low-voltage modules is connected with the grid through a converter, the topology of composite cascaded high-voltage and low-voltage modules is a wind power generation system; and when the grid side of the topology of composite cascaded high-voltage and low-voltage modules is a generator, and there is no load, the topology of composite cascaded high-voltage and low-voltage modules is an SVG.

Figure 3:
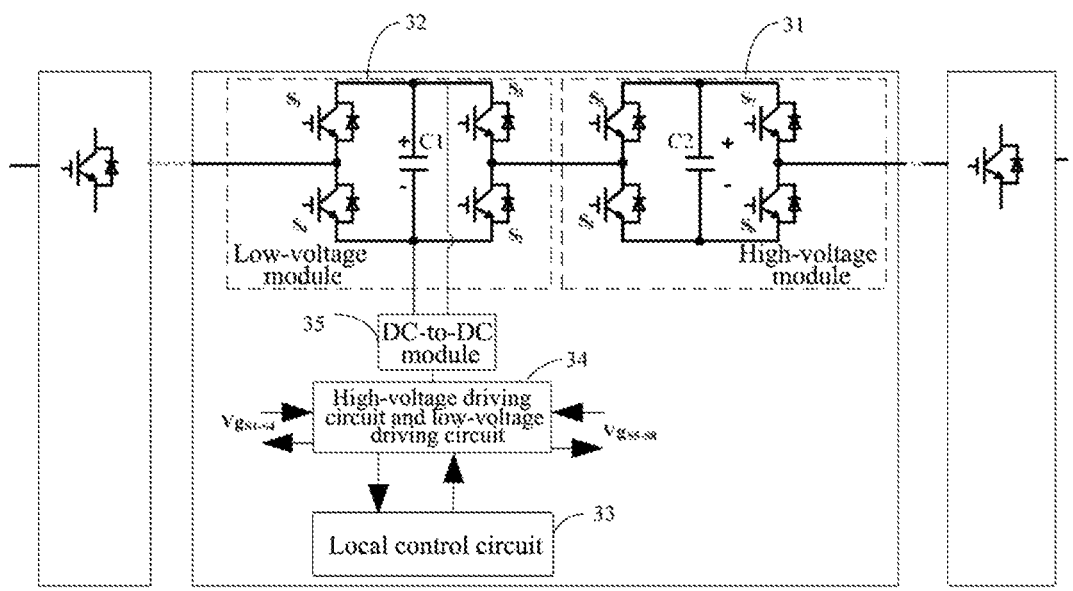
FIG. 3 is a diagram for a topology of composite cascaded high-voltage and low-voltage modules provided by an embodiment of the present disclosure.

FIG. 3 is a diagram for a topology of composite cascaded high-voltage and low-voltage modules provided by an embodiment of the present disclosure. As shown in FIG. 3, of the topology of composite cascaded high-voltage and low-voltage modules includes: at least one high-voltage module 31, at least one low-voltage module 32, at least one local control circuit 33, at least one high-voltage driving circuit, at least one low-voltage driving circuit (as shown in FIG. 3, the high-voltage driving circuit and the low-voltage driving circuit are uniformly marked by 34) as well as at least one DC-to-DC module 35. The at least one high-voltage module 31 includes a high-voltage bus capacitor C2; the at least one low-voltage module 32 includes a low-voltage bus capacitor C1; the at least one low-voltage module 32 is connected with the at least one high-voltage module 31 in a cascade manner, and a low-voltage DC bus voltage of the low-voltage bus capacitor is lower than a high-voltage DC bus voltage of the high-voltage bus capacitor; the at least one local control circuit 33 outputs at least one control signal to at least one corresponding high-voltage driving circuit and at least one corresponding low-voltage driving circuit. The at least one high-voltage driving circuit is electrically connected with a corresponding power semiconductor switch group of the at least one high-voltage module 31, for example, the high-voltage driving circuit is connected with control terminals of power semiconductor switches S5-S8, and generates at least one high-voltage drive signal according to at least one high-voltage control signal to drive ON or OFF of the power semiconductor switch group, for example, generating at least one high-voltage drive signal to drive ON or OFF of the power semiconductor switches S5-S8. The at least one low-voltage driving circuit is electrically connected with a corresponding power semiconductor switch group of the at least one low-voltage module 32, for example, a low-voltage driving circuit is connected with control terminals of power semiconductor switches S1-S4, and generates at least one low-voltage drive signal according to at least one low-voltage control signal to drive ON or OFF of the power semiconductor switch group, for example, generating at least one low-voltage drive signal to drive ON or OFF of the power semiconductor switches S1-S4. An input of the at least one DC-to-DC module 35 is connected with two ends of the low-voltage bus capacitor C1, for receiving the low-voltage DC bus voltage and converting the low-voltage DC bus voltage into a DC output voltage, so as to provide one or more of the at least one high-voltage driving circuit, the at least one low-voltage driving circuit and the at least one local control circuit 33 with a power supply.

It should be noted that, FIG. 3 merely shows one type of cascade manner. As shown in FIG. 3, in this cascade manner, high-voltage modules and low-voltage modules are cascaded alternately, namely, the high-voltage module, the low-voltage module, the high-voltage module, the low-voltage module and so forth are cascaded sequentially.

Certainly, the high-voltage modules and the low-voltage modules may also be cascaded in a manner where the high-voltage module, the low-voltage module, the low-voltage module, the high-voltage module, the low-voltage module, the low-voltage module, the high-voltage module and so forth are cascaded sequentially. In the embodiments of the present disclosure, no restriction is imposed on the cascade manner among the at least one high-voltage module and the at least one low-voltage module, it may also be that, a high-voltage module is cascaded after multiple cascaded low-voltage modules, or that a low-voltage module is cascaded after multiple cascaded high-voltage modules.

Figure 4:
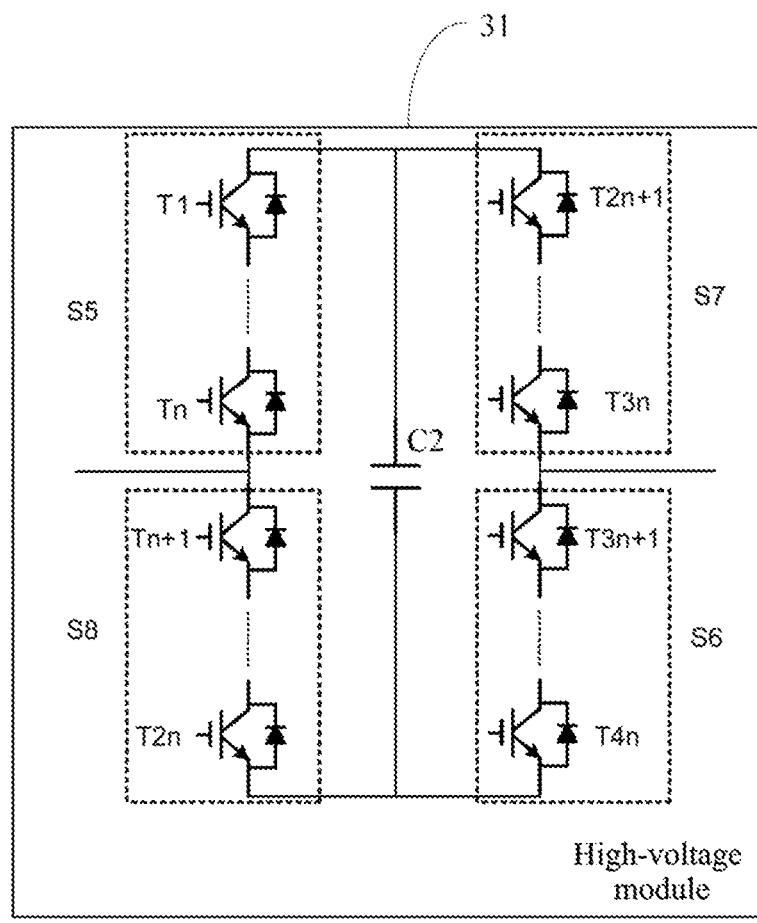
FIG. 4 is a diagram for a high-voltage module 31 provided by an embodiment of the present disclosure.

In this embodiment, the high-voltage module and the low-voltage module are both an H bridge module, and the first end of the high-voltage module is connected with the second end of the low-voltage module. In other words, the high-voltage module and the low-voltage module are directly connected. But in other embodiments, between the first end of the high-voltage module and the second end of the low-voltage module, multiple high-voltage modules in cascade connection may also be included, or multiple low-voltage modules in cascade connection may also be included. In this embodiment, the high-voltage module 31 is an H bridge module which includes a first bridge arm, a second bridge arm and the high-voltage bus capacitor C2, where the first bridge arm includes a power semiconductor switch group S5 and a power semiconductor switch group S8; the second bridge arm includes a power semiconductor switch group S7 and a power semiconductor switch group S6. The first end of the power semiconductor switch group S5 is connected with a positive end (+) of the high-voltage bus capacitor C2, the second end of the power semiconductor switch group S5 is connected with the first end of the power semiconductor switch group S8, the second end of the power semiconductor switch group S8 is connected with a negative end (−) of the high-voltage bus capacitor. The first end of the power semiconductor switch group S7 is connected with a positive end (+) of the high-voltage bus capacitor C2, the second end of the power semiconductor switch group S7 is connected with the first end of the power semiconductor switch group S6, the second end of the power semiconductor switch group S6 is connected with a negative end (−) of the high-voltage bus capacitor. The second end of the power semiconductor switch group S5 is the first end of the high-voltage module, and the second end of the power semiconductor switch group S7 is the second end of the high-voltage module. In this embodiment, the power semiconductor switch groups S5-S8 may include single high-voltage power semiconductor switch, and may also be a plurality of low-voltage power semiconductor switches connected in series. For example, referring to FIG. 4, FIG. 4 is a diagram for a high-voltage module 31 provided by an embodiment of the present disclosure. As shown in FIG. 4, the power semiconductor switch group S5 includes: n low-voltage power semiconductor switches T1-Tn connected in series, the power semiconductor switch group S8 includes: n low-voltage power semiconductor switches Tn+1-T2n connected in series, the power semiconductor switch group S7 includes: n low-voltage power semiconductor switches T2n+1-T3n connected in series, and the power semiconductor switch group S6 includes: n low-voltage power semiconductor switches T3n+1-T4n connected in series. The aforementioned high-voltage power semiconductor switch or low-voltage power semiconductor switch may be an insulated gate bipolar transistor (IGBT), an integrated gate commutated thyristor (IGCT), a semiconductor control rectifier (SCR), a metal oxide semiconductor field effect transistor (MOSFET), etc. In this embodiment, the low-voltage module is an H bridge module which includes a first bridge arm, a second bridge arm and a low-voltage bus capacitor C1, where the first bridge arm includes a power semiconductor switch group S1 and a power semiconductor switch group S4; the second bridge arm includes a power semiconductor switch group S3 and a power semiconductor switch group S2. The first end of the power semiconductor switch group S1 is connected with a positive end (+) of the low-voltage bus capacitor C1, the second end of the power semiconductor switch group S1 is connected with the first end of the power semiconductor switch group S4, the second end of the power semiconductor switch group S4 is connected with a negative end (−) of the low-voltage bus capacitor. The first end of the power semiconductor switch group S3 is connected with a positive end (+) of the low-voltage bus capacitor C1, the second end of the power semiconductor switch group S3 is connected with the first end of the power semiconductor switch group S2, the second end of the power semiconductor switch group S2 is connected with a negative end (−) of the low-voltage bus capacitor. The second end of the power semiconductor switch group S1 is the first end of the low-voltage module, and the second end of the power semiconductor switch group S3 is the second end of the low-voltage module. In this embodiment, the power semiconductor switch groups S1-S4 may include single low-voltage power semiconductor switch.

In this embodiment, the at least one local control circuit 33 may include one control circuit, and may also include a plurality of control circuits. When there is only one control circuit, the control circuit outputs 4 control signals to the high-voltage driving circuit and the low-voltage driving circuit, respectively, for controlling ON or OFF of the power semiconductor switches S1-S8. When there are a plurality of control circuits, each high-voltage module corresponds to one control circuit, and each low-voltage module corresponds to one control circuit; each control circuit outputs 4 control signals, for controlling ON or OFF of the power semiconductor switches of the high-voltage module and the low-voltage module. In the embodiment, a plurality of high-voltage modules may share one control circuit and a plurality of low-voltage modules may share one control circuit, or a plurality of high-voltage modules and a plurality of low-voltage modules may share one control circuit and the control circuit outputs 4 control signals for controlling ON or OFF of the corresponding power semiconductor switches.

At least one high-voltage driving circuit generates a high-voltage drive signal according to the control signal to drive ON or OFF of the power semiconductor switch group of the at least one high-voltage module. In other words, the local control circuit outputs the control signal to the high-voltage driving circuit, and the high-voltage driving circuit generates a high-voltage drive signal to drive ON or OFF of the power semiconductor switch group of the high-voltage module, so as to adjust the voltage between the first end and the second end of the high-voltage module, for example, the voltage between the first end and the second end of the high-voltage module is 6 kV. Likewise, the at least one low-voltage driving circuit generates a low-voltage drive signal according to the control signal to drive ON or OFF of the power semiconductor switch group of the at least one low-voltage module, so as to adjust the voltage between the first end and the second end of the low-voltage module, for example, the voltage between the first end and the second end of the low-voltage module is 1 kV. In this embodiment, each of power semiconductor switches S5-S8 of each high-voltage module is connected with a corresponding high-voltage driving circuit. In other words, one high-voltage driving circuit is connected with one power semiconductor switch, for example, a high-voltage driving circuit outputs a high-voltage drive signal to drive ON or OFF of the power semiconductor switch S5. In other embodiments, the power semiconductor switches S5-S8 of the high-voltage module are connected with one high-voltage driving circuit, in other words, one high-voltage driving circuit outputs 4 high-voltage drive signals to the power semiconductor switches S5-S8, respectively, to drive ON or OFF of the power semiconductor switches S5-S8, but no limitations are imposed herein. In this embodiment, each of power semiconductor switches S1-S4 of each low-voltage module is connected with a corresponding low-voltage driving circuit. In other words, one low-voltage driving circuit is connected with one power semiconductor switch, for example, a low-voltage driving circuit outputs a low-voltage drive signal to drive ON or OFF of the power semiconductor switch S1. In other embodiments, the power semiconductor switches S1-S4 of the low-voltage module are connected with one low-voltage driving circuit, in other words, one low-voltage driving circuit outputs 4 low-voltage drive signals to the power semiconductor switches S1-S4, respectively, to drive ON or OFF of the power semiconductor switches S1-S4, but no limitations are imposed herein.

An input of the at least one DC-to-DC module (i.e., the DC/DC module) is connected with two ends (a positive end and a negative end) of the low-voltage bus capacitor C1 for receiving the low-voltage DC bus voltage. The DC-to-DC module as an auxiliary power source (such as 24V) takes power from the low-voltage module and provides one or more of the at least one high-voltage driving circuit, the at least one low-voltage driving circuit and the at least one local control circuit with a power supply. In other embodiments, the auxiliary power source (such as 24V) may provide the at least one high-voltage driving circuit and the at least one low-voltage driving circuit with the power supply. The auxiliary power source may also provide the at least one high-voltage driving circuit, the at least one low-voltage driving circuit and the at least one local control circuit with a power supply.

In the embodiments of the present disclosure, the topology of composite cascaded high-voltage and low-voltage modules includes: at least one high-voltage module and at least one low-voltage module which are cascaded, thereby solving the problems of numerous control signals, a larger number of low-voltage modules, higher cost and lower power density in cascaded low-voltage modules. In the topology, because the input of at least one DC-to-DC module is connected with two ends of the low-voltage bus capacitor, the voltage between a primary side and a secondary side of the transformer of the DC-to-DC module is only required to reach or exceed the low-voltage DC bus voltage, thus insulation of the transformer is realized easily.

Optionally, the at least one local control circuit includes: at least one high-voltage control circuit which is electrically connected with at least one corresponding high-voltage driving circuit for outputting a high-voltage control signal; and at least one low-voltage control circuit which is electrically connected with at least one corresponding low-voltage driving circuit for outputting a low-voltage control signal. In other words, the high-voltage control circuit controls the high-voltage module through the high-voltage driving circuit; likewise, the low-voltage control circuit controls the low-voltage module through the low-voltage driving circuit. The at least one high-voltage driving circuit may be independently controlled by the at least one high-voltage control circuit and the at least one low-voltage driving circuit may be independently controlled by the at least one low-voltage control circuit, which reduces delay of the control signal.

Figure 5:
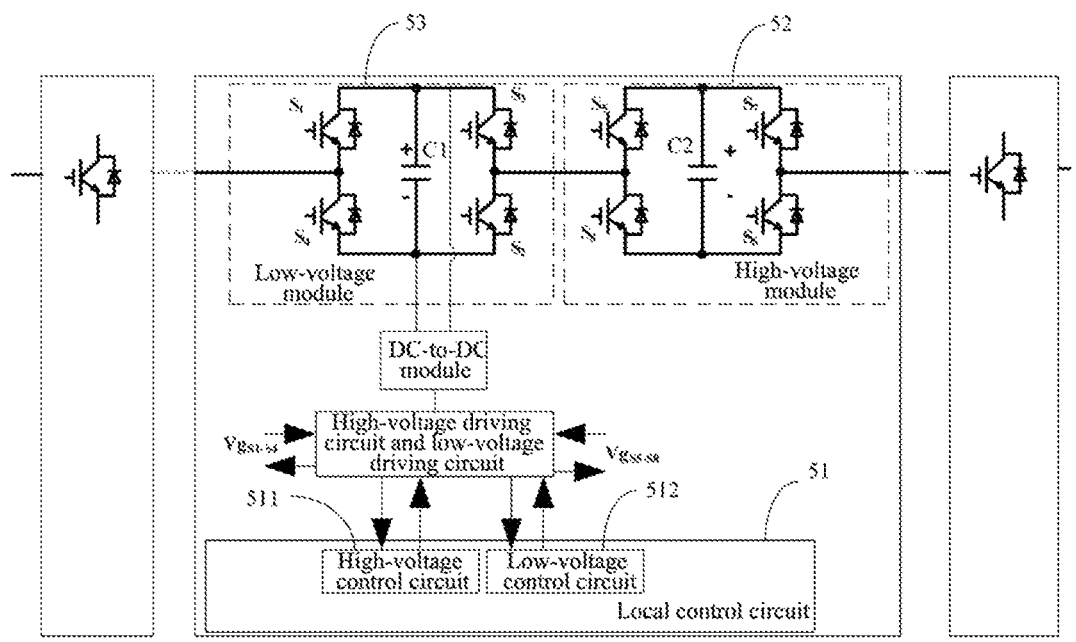
FIG. 5 is a diagram for a topology of composite cascaded high-voltage and low-voltage modules provided by another embodiment of the present disclosure.

FIG. 5 is a diagram for a topology of composite cascaded high-voltage and low-voltage modules provided by another embodiment of the present disclosure. As shown in FIG. 5, at least one local control circuit 51 includes: at least one high-voltage control circuit 511 and at least one low-voltage control circuit 512. There may be one or a plurality of high-voltage control circuits 511. When there are a plurality of high-voltage control circuits 511, each high-voltage control circuit 511 is electrically connected with one corresponding high-voltage driving circuit for outputting 4 high-voltage control signals to the high-voltage driving circuits which are connected with the power semiconductor switches. One high-voltage control circuit 511 is electrically connected with a plurality of high-voltage driving circuits for outputting 4 high-voltage control signals to the high-voltage driving circuits which are connected with the power semiconductor switches. When there is one high-voltage control circuit 511, the high-voltage control circuit 511 is electrically connected with each high-voltage driving circuit for outputting 4 high-voltage control signals to the high-voltage driving circuits which are connected with the power semiconductor switches. There may be one or a plurality of low-voltage control circuits 512. When there are a plurality of low-voltage control circuits 512, each low-voltage control circuit 512 is electrically connected with one corresponding low-voltage driving circuit for outputting 4 low-voltage control signals to the low-voltage driving circuits which are connected with the power semiconductor switches. One low-voltage control circuit 512 is electrically connected with a plurality of low-voltage driving circuits for outputting 4 low-voltage control signals to the low-voltage driving circuits which are connected with the power semiconductor switches. When there is one low-voltage control circuit 512, the low-voltage control circuit 512 is electrically connected with each low-voltage driving circuit for outputting 4 low-voltage control signals to the low-voltage driving circuits which are connected with the power semiconductor switches. As shown in FIG. 5, one high-voltage control circuit controls one corresponding high-voltage module, and one low-voltage control circuit controls one corresponding low-voltage module. Certainly, one high-voltage control circuit may control two corresponding high-voltage modules and one low-voltage control circuit may control two corresponding low-voltage modules, etc. There is no limitation by the embodiment of the present disclosure.

In the embodiment of the present disclosure, the at least one high-voltage driving circuit may be independently controlled by the at least one high-voltage control circuit and the at least one low-voltage driving circuit may be independently controlled by the at least one low-voltage control circuit, which reduces delay of the control signal.

Optionally, each high-voltage module is an H bridge module, a three-level module or a half-bridge module; and each low-voltage module is an H bridge module, a three-level module or a half-bridge module. It should be noted that, each low-voltage module can be identical with each high-voltage module, i.e. the high-voltage module and the low-voltage module have the same module type. In other words, in the topology of composite cascaded high-voltage and low-voltage modules, both the high-voltage module and the low-voltage module may be an H bridge module, or a three-level module, or a half-bridge module, etc.

For example, as shown in FIG. 5, the topology of composite cascaded high-voltage and low-voltage modules includes: at least one high-voltage module, at least one low-voltage module, at least one DC-to-DC module, at least one high-voltage driving circuit, at least one low-voltage driving circuit and at least one local control circuit; the at least one high-voltage module is connected with the at least one low-voltage module in a cascade manner, wherein both the high-voltage module and the low-voltage module adopt an H module.

Figure 6:
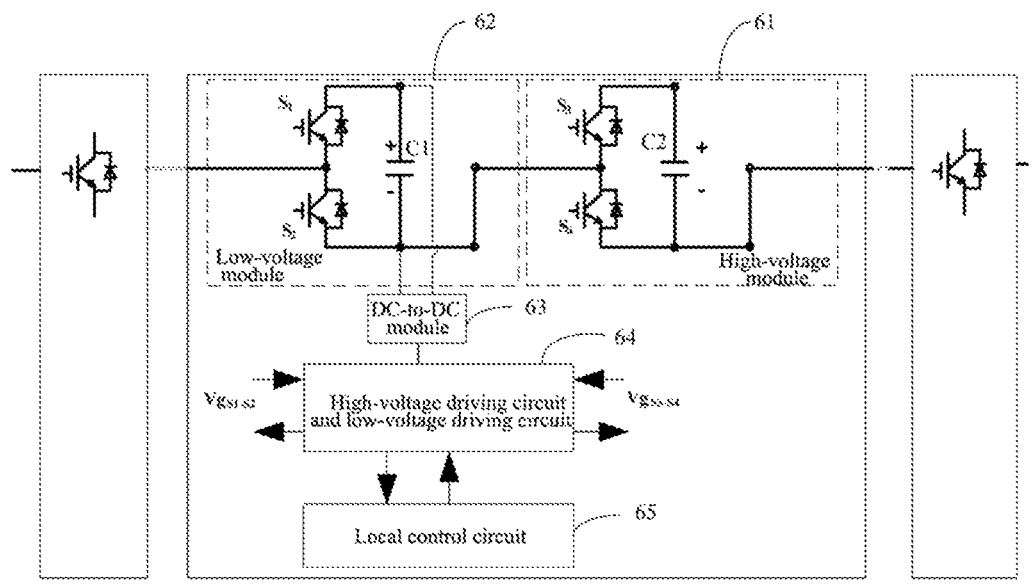
FIG. 6 is a diagram for a topology of composite cascaded high-voltage and low-voltage modules provided by yet another embodiment of the present disclosure.

FIG. 6 is a diagram for a topology of composite cascaded high-voltage and low-voltage modules provided by yet another embodiment of the present disclosure. As shown in FIG. 6, the topology of composite cascaded high-voltage and low-voltage modules includes: at least one high-voltage module 61, at least one low-voltage module 62, at least one DC-to-DC module 63, at least one high-voltage driving circuit and at least one low-voltage driving circuit (as shown in FIG. 6, the high-voltage driving circuit and the low-voltage driving circuit are uniformly marked by 64), and at least one local control circuit 65. The at least one high-voltage module 61 is connected with the at least one low-voltage module 62 in a cascade manner. Each high-voltage module 61 includes one bridge arm and a high-voltage bus capacitor C2. The bridge arm includes a power semiconductor switch S3 and a power semiconductor switch S4. The first end of the power semiconductor switch S3 is connected with a positive end of the high-voltage bus capacitor C2, the second end of the power semiconductor switch S3 is connected with the first end of the power semiconductor switch S4, the second end of the power semiconductor switch S4 is connected with a negative end of the high-voltage bus capacitor C2, wherein the second end of the power semiconductor switch S3 is the first end of the high-voltage module; the second end of the power semiconductor switch S4 is the second end of the high-voltage module. Each low-voltage module 62 includes one bridge arm and a low-voltage bus capacitor C1. The bridge arm includes a power semiconductor switch S1 and a power semiconductor switch S2. The first end of the power semiconductor switch S1 is connected with a positive end of the low-voltage bus capacitor C1, the second end of the power semiconductor switch S1 is connected with the first end of the power semiconductor switch S2, the second end of the power semiconductor switch S2 is connected with a negative end of the low-voltage bus capacitor C1, wherein the second end of the power semiconductor switch S1 is the first end of the low-voltage module; the second end of the power semiconductor switch S2 is the second end of the low-voltage module. In this embodiment, the second end of one of two adjacent modules among the topology of composite cascaded high-voltage module 61 and low-voltage module 62 is connected with the first end of the other of the two adjacent modules among the topology of composite cascaded high-voltage module 61 and low-voltage module 62. In this embodiment, the power semiconductor switches S3-S4 may include a single high-voltage power semiconductor switch. Or the power semiconductor switches S3-S4 may also include a plurality of low-voltage power semiconductor switches connected in series.

In this embodiment, the at least one local control circuit 65 may include one control circuit, or may also include a plurality of control circuits. When there is only one control circuit, the control circuit outputs 2 control signals to the high-voltage driving circuit and the low-voltage driving circuit, respectively, for controlling ON or OFF of the power semiconductor switches S1-S4. When there are a plurality of control circuits, each high-voltage module 61 needs one control circuit and each low-voltage module 62 needs one control circuit. Each control circuit outputs 2 control signals for controlling ON or OFF of the power semiconductor switches of the high-voltage module and the low-voltage module. In other embodiment, a plurality of high-voltage modules 61 share one control circuit and a plurality of low-voltage modules 62 share one control circuit. In other embodiment, a plurality of high-voltage modules 61 and a plurality of low-voltage modules 62 share one control circuit. The control circuit outputs 2 control signals for controlling ON or OFF of the corresponding power semiconductor switches.

Figure 7:
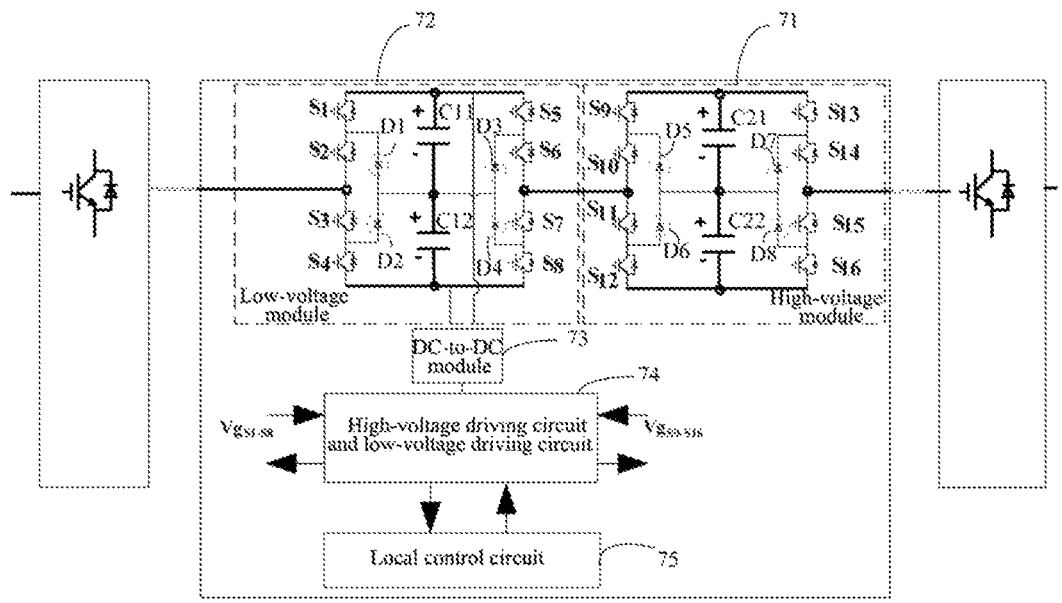
FIG. 7 is a diagram for a topology of composite cascaded high-voltage and low-voltage modules provided by a further embodiment of the present disclosure.

FIG. 7 is a diagram for a topology of composite cascaded high-voltage and low-voltage modules provided by a further embodiment of the present disclosure. As shown in FIG. 7, the topology of composite cascaded high-voltage and low-voltage modules includes: at least one high-voltage module 71, at least one low-voltage module 72, at least one DC-to-DC module 73, at least one high-voltage driving circuit and at least one low-voltage driving circuit (as shown in FIG. 7, the high-voltage driving circuit and the low-voltage driving circuit are uniformly marked by 74), and at least one local control circuit 75. The at least one high-voltage module 71 is connected with the at least one low-voltage module 72 in a cascade manner, wherein both the high-voltage module 71 and the low-voltage module 72 adopt a three-level module. Each high-voltage module 71 includes 8 power semiconductor switches, 4 clamp diodes, a first high-voltage bus capacitor C21 and a second high-voltage bus capacitor C22. The first end of the power semiconductor switch S9 is connected with a positive end of the first high-voltage bus capacitor C21 and the first end of the power semiconductor switch S13; the second end of the power semiconductor switch S9 is connected with the first end of the power semiconductor switch S10 and a cathode of the clamp diode D5; the second end of the power semiconductor switch S10 is connected with the first end of the power semiconductor switch S11; the second end of the power semiconductor switch S11 is connected with the first end of the power semiconductor switch S12 and an anode of the clamp diode D6; the second end of the power semiconductor switch S12 is connected with a negative end of the second high-voltage bus capacitor C22 and the second end of the power semiconductor switch S16; the second end of the power semiconductor switch S13 is connected with the first end of the power semiconductor switch S14 and a cathode of the clamp diode D7; the second end of the power semiconductor switch S14 is connected with the first end of the power semiconductor switch S15; the second end of the power semiconductor switch S15 is connected with an anode of the clamp diode D8 and the first end of the power semiconductor switch S16; an anode of the clamp diode D5 is connected with a cathode of the clamp diode D6, a negative end of the first high-voltage bus capacitor C21 and a positive end of the second high-voltage bus capacitor C22; an anode of the clamp diode D7 is connected with a cathode of the clamp diode D8, a negative end of the first high-voltage bus capacitor C21 and a positive end of the second high-voltage bus capacitor C22. The second end of the power semiconductor switch S10 is the first end of the high-voltage module and the second end of the power semiconductor switch S14 is a second end of the high-voltage module. Each low-voltage module 72 includes 8 power semiconductor switches, 4 clamp diodes, a first low-voltage bus capacitor C11 and a second low-voltage bus capacitor C12. The first end of the power semiconductor switch S1 is connected with a positive end of the first low-voltage bus capacitor C11 and the first end of the power semiconductor switch S5; the second end of the power semiconductor switch S1 is connected with the first end of the power semiconductor switch S2 and a cathode of the clamp diode D1; the second end of the power semiconductor switch S2 is connected with the first end of the power semiconductor switch S3; the second end of the power semiconductor switch S3 is connected with the first end of the power semiconductor switch S4 and an anode of the clamp diode D2; the second end of the power semiconductor switch S4 is connected with a negative end of the second low-voltage bus capacitor C12 and the second end of the power semiconductor switch S8; the second end of the power semiconductor switch S5 is connected with the first end of the power semiconductor switch S6 and a cathode of the clamp diode D3; the second end of the power semiconductor switch S6 is connected with the first end of the power semiconductor switch S7; the second end of the power semiconductor switch S7 is connected with an anode of the clamp diode D4 and the first end of the power semiconductor switch S8; an anode of the clamp diode D1 is connected with a cathode of the clamp diode D2, a negative end of the first low-voltage bus capacitor C11 and a positive end of the second low-voltage bus capacitor C12; an anode of the clamp diode D3 is connected with a cathode of the clamp diode D4, a negative end of the first low-voltage bus capacitor C11 and a positive end of the second low-voltage bus capacitor C12. The second end of the power semiconductor switch S2 is the first end of the low-voltage module, and the second end of the power semiconductor switch S6 is the second end of the low-voltage module. In this embodiment, the first end of one of two adjacent modules among the high-voltage modules and the low-voltage modules are connected with the second of the other of the two adjacent modules among the high-voltage modules and the low-voltage modules. In this embodiment, the power semiconductor switches may include a single high-voltage power semiconductor switch. The power semiconductor switches may also be a plurality of low-voltage power semiconductor switches connected in series.

In this embodiment, the at least one local control circuit 75 may include one control circuit, or may also include a plurality of control circuits. When there is only one control circuit, the control circuit outputs 8 control signals to the high-voltage driving circuit and the low-voltage driving circuit, respectively, for controlling ON or OFF of the power semiconductor switches S1-S16. When there are a plurality of control circuits, each high-voltage module 71 needs one control circuit and each low-voltage module 72 needs one control circuit. Each control circuit outputs 8 control signals for controlling ON or OFF of the power semiconductor switches of the high-voltage module 71 and the low-voltage module 72. In other embodiment, a plurality of high-voltage modules 71 share one control circuit and a plurality of low-voltage modules 72 share one control circuit, or a plurality of high-voltage modules 71 and a plurality of low-voltage modules 72 share one control circuit. The control circuit outputs 8 control signals for controlling ON or OFF of the corresponding power semiconductor switches.

Figure 8:
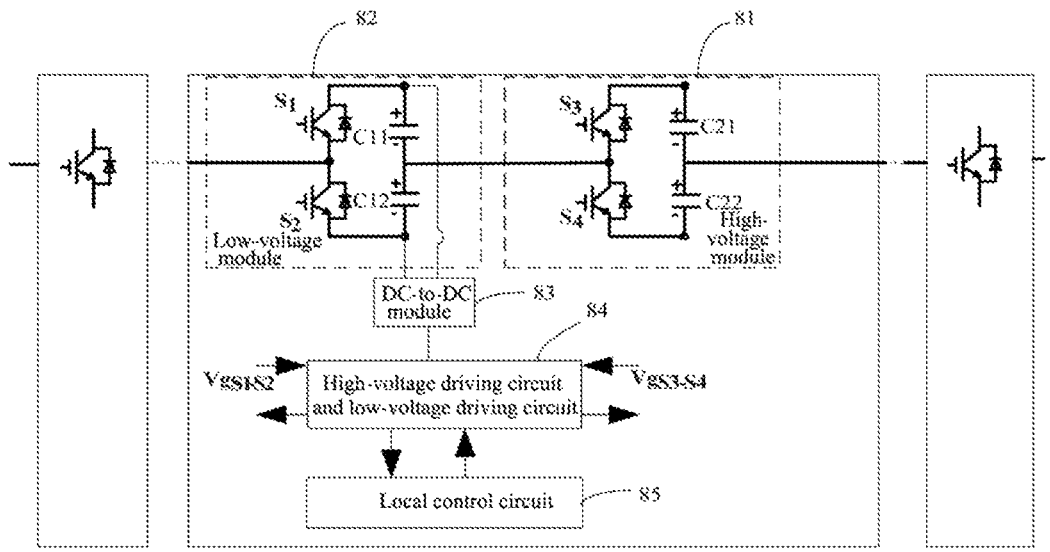
FIG. 8 is a diagram for a topology of composite cascaded high-voltage and low-voltage modules provided by yet another embodiment of the present disclosure.

FIG. 8 is a diagram for a topology of composite cascaded high-voltage and low-voltage modules provided by yet another embodiment of the present disclosure. As shown in FIG. 8, the topology of composite cascaded high-voltage and low-voltage modules includes: at least one high-voltage module 81, at least one low-voltage module 82, at least one DC-to-DC module 83, at least one high-voltage driving circuit and at least one low-voltage driving circuit (as shown in FIG. 8, the high-voltage driving circuit and the low-voltage driving circuit are uniformly marked by 84) and at least one local control circuit 85. The at least one high-voltage module 81 is connected with the at least one low-voltage module 82 in a cascade manner, where both the high-voltage module 81 and the low-voltage module 82 adopt a half-bridge module. Each high-voltage module 81 includes one bridge arm, a bus capacitor C21 and a bus capacitor C22. The bridge arm includes a power semiconductor switch S3 and a power semiconductor switch S4. The first end of the power semiconductor switch S3 is connected with a positive end of the bus capacitor C21, the second end of the power semiconductor switch S3 is connected with the first end of the power semiconductor switch S4, the second end of the power semiconductor switch S4 is connected with a negative end of the bus capacitor C22, a negative end of the bus capacitor C21 is connected with positive end of the bus capacitor C22. The second end of the power semiconductor switch S3 is the first end of the high-voltage module and a negative end of the bus capacitor C21 is the second end of the high-voltage module. Each low-voltage module 82 includes one bridge arm, a bus capacitor C11 and a bus capacitor C12. The bridge arm includes a power semiconductor switch S1 and a power semiconductor switch S2. The first end of the power semiconductor switch S1 is connected with a positive end of the bus capacitor C11, the second end of the power semiconductor switch S1 is connected with the first end of the power semiconductor switch S2, the second end of the power semiconductor switch S2 is connected with a negative end of the bus capacitor C12, and a negative end of the bus capacitor C11 is connected with a positive end of the bus capacitor C12. The second end of the power semiconductor switch S1 is the first end of the low-voltage module and a negative end of the bus capacitor C11 is the second end of the low-voltage module. In this embodiment, the first end of one of two adjacent modules among the high-voltage module 81 and the low-voltage module 82 are connected with the second end of the other of the two adjacent modules among the high-voltage modules 81 and the low-voltage modules 82. In this embodiment, the power semiconductor switches S3-S4 may include a single high-voltage power semiconductor switch. In other embodiment, the power semiconductor switches S3-S4 may also be a plurality of low-voltage power semiconductor switches connected in series.

In this embodiment, the at least one local control circuit 85 may include one control circuit, or may also include a plurality of control circuits. When there is only one control circuit, the control circuit outputs 2 control signals to the high-voltage driving circuit and the low-voltage driving circuit, respectively, for controlling ON or OFF of the power semiconductor switches S1-S4. When there are a plurality of control circuits, each high-voltage module 81 needs one control circuit and each low-voltage module 82 needs one control circuit. Each control circuit outputs 2 control signals for controlling ON or OFF of the power semiconductor switches of the high-voltage module 81 and the low-voltage module 82. And a plurality of high-voltage modules 81 share one control circuit and a plurality of low-voltage modules 82 share one control circuit, or a plurality of high-voltage modules 81 and multiple low-voltage modules 82 share one control circuit. The control circuit outputs 2 control signals for controlling ON or OFF of the corresponding power semiconductor switches.

Figure 9:
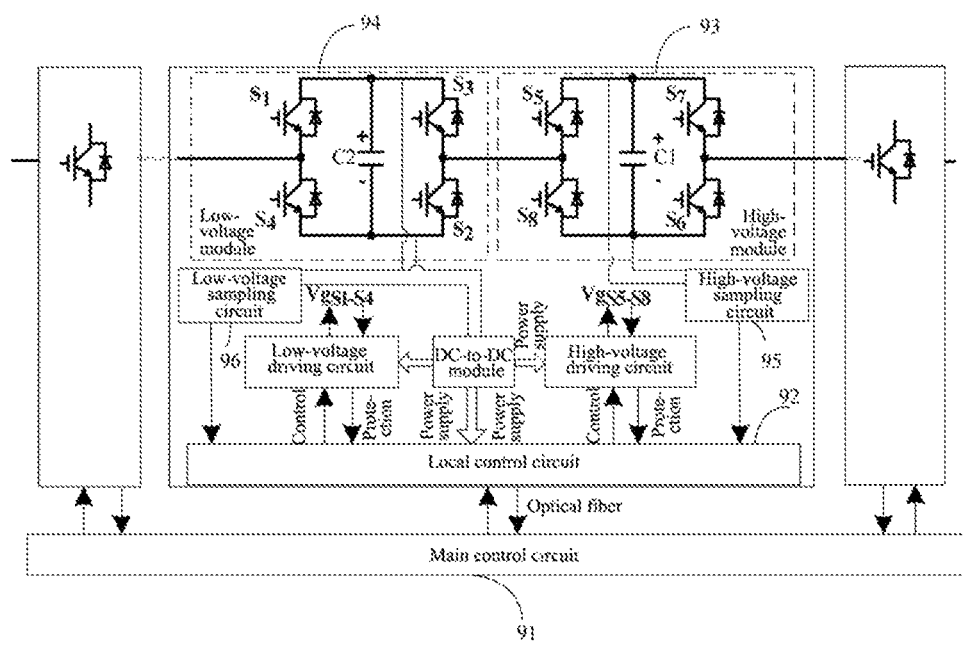
FIG. 9 is a diagram for a topology of composite cascaded high-voltage and low-voltage modules provided by a further embodiment of the present disclosure.

Optionally, FIG. 9 is a diagram for a topology of composite cascaded high-voltage and low-voltage modules provided by a further embodiment of the present disclosure. As shown in FIG. 9, the topology of composite cascaded high-voltage and low-voltage modules also includes a main control circuit 91. The main control circuit 91 transmits a main control signal through an optical fiber to at least one local control circuit 92 and the at least one local control circuit 92 generates at least one control signal according to the main control signal. The local control circuit 92 may be a field-programmable gate array (FPGA) or a digital signal processing (DSP) control framework. And as shown in FIG. 9, possibly, in an order from left to right or from right to left, adjacent high-voltage module 93 and low-voltage module 94 share one local control circuit 92 which is connected with the main control circuit 91.

As shown in FIG. 9, the topology of composite cascaded high-voltage and low-voltage modules also includes a high-voltage sampling circuit 95 and a low-voltage sampling circuit 96. The high-voltage sampling circuit 95 is electrically connected with two ends of a high-voltage bus capacitor C1, so as to collect the high-voltage DC bus voltage and output a high-voltage sampling signal according to the high-voltage DC bus voltage. The low-voltage sampling circuit 96 is electrically connected with two ends of a low-voltage bus capacitor C2, so as to collect the low-voltage DC bus voltage and output a low-voltage sampling signal according to the low-voltage DC bus voltage.

Further, the high-voltage sampling circuit 95 and the low-voltage sampling circuit 96 are electrically connected with at least one local control circuit 92 for transmitting the high-voltage sampling signal and the low-voltage sampling signal to the main control circuit 91.

Figure 10:
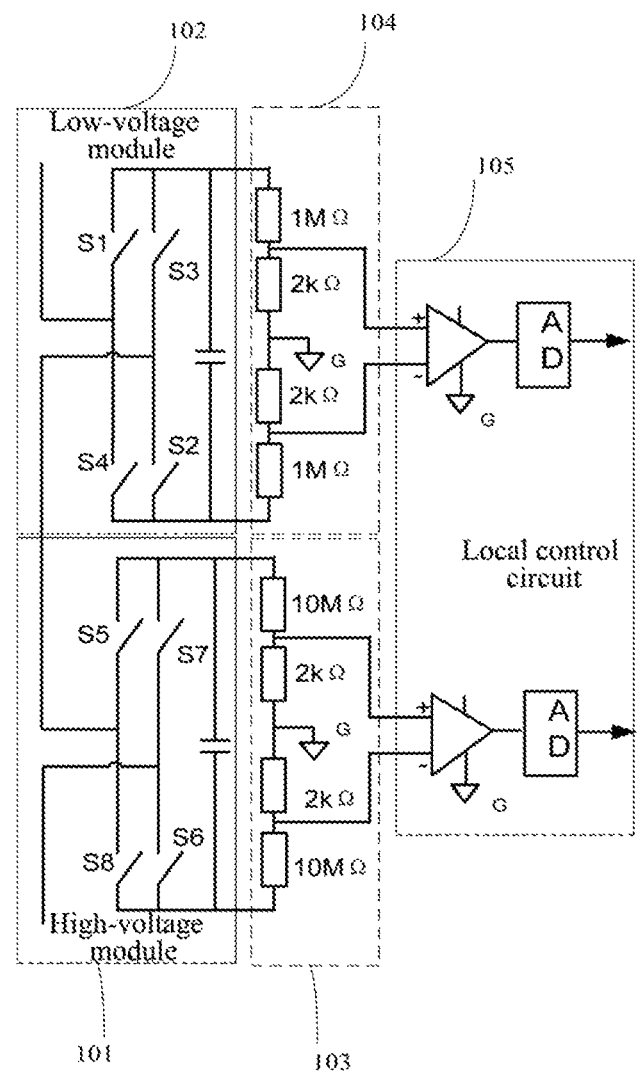
FIG. 10 is a local diagram for a topology of composite cascaded high-voltage and low-voltage modules provided by an embodiment of the present disclosure.

FIG. 10 is a local diagram for a topology of composite cascaded high-voltage and low-voltage modules provided by an embodiment of the present disclosure. As shown in FIG. 10, the topology of composite cascaded high-voltage and low-voltage modules includes: a high-voltage module 101 and a low-voltage module 102, a high-voltage sampling circuit 103 connected with the high-voltage module 101 and a low-voltage sampling circuit 104 connected with the low-voltage module 102. The high-voltage sampling circuit 103 is a differential sampling circuit including: at least one resistor which is larger than a first preset threshold. The at least one resistor is used to isolate a high potential of the high-voltage module. As shown in FIG. 10, the differential sampling circuit includes two resistors of 10 mΩ and two resistors of 2 kΩ. The two resistors of 2 kΩ are connected in series between the two resistors of 10MΩ to form a series branch. The series branch is connected with two ends of a bus capacitor C1 in parallel. The connection points of the 10 MΩ resistors with the 2 kΩ resistors are connected to the local control circuit 105 and the connection points of the two 2 kΩ resistors are connected with the ground. The resistor is used to isolate the high potential of the high-voltage module 101. Optionally, the low-voltage sampling circuit 104 is a differential sampling circuit which includes: at least one resistor which is larger than a second preset threshold. The at least one resistor is used to isolate a high potential of the low-voltage module. As shown in FIG. 10, the low-voltage sampling circuit includes two 1 MΩ resistors and two 2 kΩ resistors. The two 2 kΩ resistors are connected in series between the two 1 MΩ resistors to form a series branch and the series branch is connected with two ends of a bus capacitor C2 in parallel. The connection points of the 1 MΩ resistor with the 2 kΩ resistor are connected to the local control circuit 105 and the connection points of the two 2 kΩ resistors are connected with the around. The resistor is used to isolate the high potential of the low-voltage module 102.

Optionally, each DC-to-DC module may be of an isolation DC/DC topology.

Figure 11:
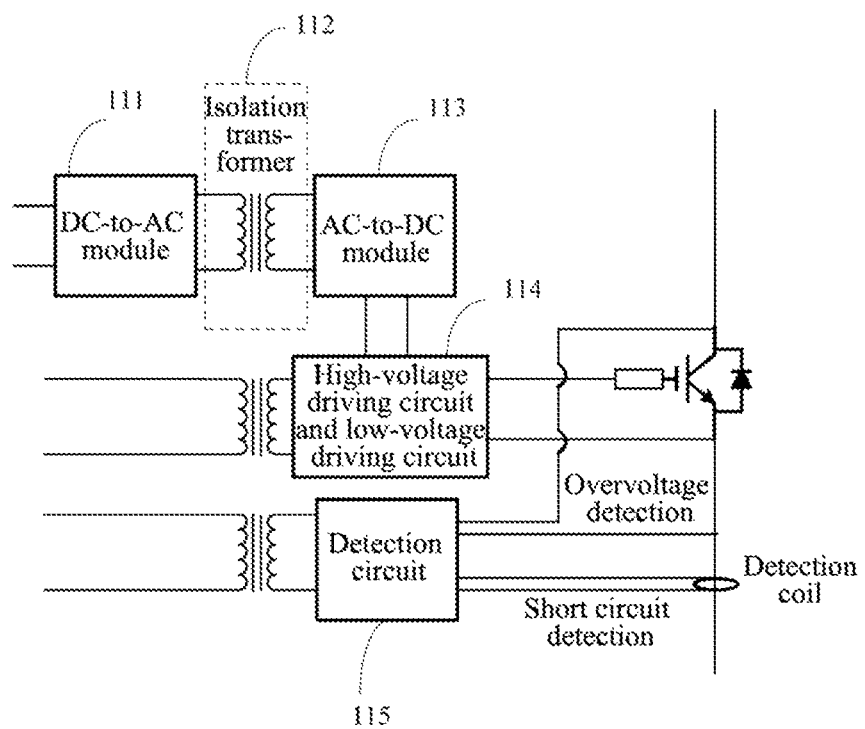
FIG. 11 is a local diagram for a topology of composite cascaded high-voltage and low-voltage modules provided by another embodiment of the present disclosure.

Optionally FIG. 11 is a local diagram for a topology of composite cascaded high-voltage and low-voltage modules provided by another embodiment of the present disclosure. As shown in FIG. 11, the topology of composite cascaded high-voltage and low-voltage modules also includes a DC-to-AC (DC/AC) module 111, an isolation transformer 112 and an AC-to-DC (AC/DC) module 113. The DC-to-AC module 111 is electrically connected with the DC-to-DC module, receives and converts the DC output voltage outputted by the DC-to-DC module into a first alternating voltage. The first alternating voltage is transmitted via the isolation transformer 112 to the AC-to-DC module 113. The AC-to-DC module 113 receives and converts the first alternating voltage into a driving voltage for providing the high-voltage driving circuit and the low-voltage driving circuit 114 with a power supply. And as shown in FIG. 11, the topology of composite cascaded high-voltage and low-voltage modules also includes: a detection circuit 115 which is used for overvoltage detection and short circuit detection and for transmitting a measured failure signal back to the local control circuit through an additional isolation transformer.

Finally, it should be noted that, the above embodiments are merely meant to illustrate rather than limit the technical solutions of the present disclosure; and although the present disclosure has been concretely described in reference to the above embodiments, one with ordinary skill in the art shall understand that modifications can still be made to the technical solutions recorded in the foregoing embodiments, or that equivalent substitutions can still be made to part or all of the technical features therein; neither these modifications nor these substitutions shall make the essence of the corresponding technical solutions depart from the scope of the technical solutions in the embodiments of the present disclosure.

What is claimed is:

1. A topology of composite cascaded high-voltage and low-voltage modules, comprising:
   at least one high-voltage module, comprising a high-voltage bus capacitor;
   at least one low-voltage module, comprising a low-voltage bus capacitor; wherein the at least one low-voltage module is connected with the at least one high-voltage module in a cascade manner, and a low-voltage direct current (DC) bus voltage of the low-voltage bus capacitor is lower than a high-voltage DC bus voltage of the high-voltage bus capacitor;
   at least one local control circuit, for outputting at least one control signal to at least one high-voltage driving circuit and at least one low-voltage driving circuit;
   the at least one high-voltage driving circuit, electrically connected with a corresponding power semiconductor switch group of the at least one high-voltage module, for generating a high-voltage drive signal according to the at least one control signal to drive ON or OFF of the power semiconductor switch group;
   the at least one low-voltage driving circuit, electrically connected with a corresponding power semiconductor switch group of the at least one low-voltage module, for generating a low-voltage drive signal according to the at least one control signal to drive ON or OFF of the power semiconductor switch group; and at least one DC-to-DC module, wherein an input of the at least one DC-to-DC module is connected with two ends of the low-voltage bus capacitor for receiving the low-voltage DC bus voltage and converting the low-voltage DC bus voltage into a DC output voltage, so as to provide one or more of the at least one high-voltage driving circuit, the at least one low-voltage driving circuit and the at least one local control circuit with a power supply.

2. The topology of composite cascaded high-voltage and low-voltage modules according to claim 1, wherein,
the at least one local control circuit comprises:
at least one high-voltage control circuit, electrically connected with a corresponding high-voltage driving circuit of the at least one high-voltage driving circuit; and
at least one low-voltage control circuit, electrically connected with a corresponding low-voltage driving circuit of the at least one low-voltage driving circuit;
the at least one control signal comprises a high-voltage control signal and a low-voltage control signal, wherein the high-voltage control signal is outputted by the at least one high-voltage control circuit; and the low-voltage control signal is outputted by the at least one low-voltage control circuit.

3. The topology of composite cascaded high-voltage and low-voltage modules according to claim 1, wherein the at least one high-voltage module or the at least one low-voltage module is an H bridge module, a three-level module or a half-bridge module.

4. The topology of composite cascaded high-voltage and low-voltage modules according to claim 3, wherein the power semiconductor switch group of the at least one high-voltage module comprises a plurality of power semiconductor switches connected in series.

5. The topology of composite cascaded high-voltage and low-voltage modules according to claim 1, further comprising: a main control circuit, wherein the main control circuit is coupled to the at least one local control circuit for outputting a main control signal to the at least one local control circuit, wherein the at least one control signal is generated by the at least one local control circuit according to the main control signal.

6. The topology of composite cascaded high-voltage and low-voltage modules according to claim 5, further comprising: a high-voltage sampling circuit and a low-voltage sampling circuit, wherein the high-voltage sampling circuit is electrically connected with two ends of the high-voltage bus capacitor for collecting the high-voltage DC bus voltage and outputting a high-voltage sampling signal according to the high-voltage DC bus voltage; and the low-voltage sampling circuit is electrically connected with two ends of the low-voltage bus capacitor for collecting the low-voltage DC bus voltage and outputting a low-voltage sampling signal according to the low-voltage DC bus voltage.

7. The topology of composite cascaded high-voltage and low-voltage modules according to claim 6, wherein the high-voltage sampling circuit and the low-voltage sampling circuit are electrically connected with the at least one local control circuit, and the at least one local control circuit is capable of transmitting a received high-voltage sampling signal and a received low-voltage sampling signal to the main control circuit.

8. The topology of composite cascaded high-voltage and low-voltage modules according to claim 1, further comprising: a DC-to-alternating current (AC) module, an isolation transformer and an AC-to-DC module, wherein the DC-to-AC module is electrically connected with the DC-to-DC module for receiving and converting the DC output voltage outputted by the DC-to-DC module into a first alternating voltage, wherein the first alternating voltage is transmitted to the AC-to-DC module via the isolation transformer, and the AC-to-DC module is capable of receiving and converting the first alternating voltage into a driving voltage for providing the high-voltage driving circuit and the low-voltage driving circuit with the power supply.

9. The topology of composite cascaded high-voltage and low-voltage modules according to claim 1, wherein the at least one DC-to-DC module is an isolation DC-to-DC module.

10. The topology of composite cascaded high-voltage and low-voltage modules according to claim 3, wherein the at least one high-voltage module and the at least one low-voltage module have a same module type.

* * * * *